United States Patent
Stamos et al.

(10) Patent No.: US 11,989,530 B2
(45) Date of Patent: May 21, 2024

(54) AVOIDING HOT SPOTS DURING INGEST WHERE INGEST ORDERING MUST BE PRESERVED

(71) Applicant: Oracle International Corporation, Redwood Shores, CA (US)

(72) Inventors: James W. Stamos, Saratoga, CA (US); Devendra Singh, Banglore (IN)

(73) Assignee: Oracle International Corporation, Redwood Shores, CA (US)

( * ) Notice: Subject to any disclaimer, the term of this patent is extended or adjusted under 35 U.S.C. 154(b) by 960 days.

(21) Appl. No.: 15/841,149

(22) Filed: Dec. 13, 2017

(65) Prior Publication Data

US 2019/0179613 A1    Jun. 13, 2019

(51) Int. Cl.
*G06F 5/06* (2006.01)
*G06F 16/22* (2019.01)
*G06F 16/23* (2019.01)
*G06F 16/27* (2019.01)

(52) U.S. Cl.
CPC ............ *G06F 5/065* (2013.01); *G06F 16/221* (2019.01); *G06F 16/2282* (2019.01); *G06F 16/2379* (2019.01); *G06F 16/278* (2019.01); *G06F 2205/067* (2013.01)

(58) Field of Classification Search
CPC .... G06F 5/065; G06F 16/221; G06F 16/2282; G06F 16/2379; G06F 16/278; G06F 2205/067
See application file for complete search history.

(56) References Cited

U.S. PATENT DOCUMENTS

| | | | |
|---|---|---|---|
| 7,548,514 B1 * | 6/2009 | Choudhury | H04L 41/00 370/236 |
| 9,495,296 B2 | 11/2016 | Subramanyam et al. | |
| 9,767,138 B2 | 9/2017 | Jaiswal et al. | |
| 9,792,349 B2 | 10/2017 | Boe et al. | |
| 2012/0296883 A1 * | 11/2012 | Ganesh | G06F 16/185 707/693 |
| 2014/0372702 A1 * | 12/2014 | Subramanyam | G06F 12/0848 711/129 |
| 2018/0150407 A1 * | 5/2018 | Brown | G06F 12/1081 |

* cited by examiner

*Primary Examiner* — Cam Y T Truong
(74) *Attorney, Agent, or Firm* — Hickman Becker Bingham Ledesma LLP

(57) ABSTRACT

Techniques are described herein for achieving physically dispersed item-dispersal patterns in queue tables that are used as circular buffers in a FIFO system. The techniques achieve the physically dispersed item-dispersal patterns while retaining FIFO semantics, efficient data ingest, efficient data access, and low latency for both fixed and variable-size ingest data. Because consecutively inserted rows are written to physically dispersed locations on persistent storage, lock contention between concurrent ingest sessions is significantly reduced. Once a physically dispersed item-dispersal pattern is established for a first set of inserted rows, subsequent rows are added by overwriting the existing rows. The physical dispersal of the initial rows may be accomplished by setting values in a slot number column such that updates that are made in a sequence that is based on the slot number column exhibit a desired physical dispersal pattern.

28 Claims, 13 Drawing Sheets

QUEUE TABLE 300

| ROW | SLOT_NUMBER | ITEM | SEQ# |
|---|---|---|---|
| R1 | 1 | ITEM31 | 31 |
| R2 | 2 | ITEM32 | 32 |
| R3 | 3 | ITEM33 | 33 |
| R4 | 4 | ITEM19 | 19 |
| R5 | 5 | ITEM20 | 20 |
| R6 | 6 | ITEM21 | 21 |
| R7 | 7 | ITEM22 | 22 |
| R8 | 8 | ITEM23 | 23 |
| R9 | 9 | ITEM24 | 24 |
| R10 | 10 | ITEM25 | 25 |
| R11 | 11 | ITEM26 | 26 |
| R12 | 12 | ITEM27 | 27 |
| R13 | 13 | ITEM28 | 28 |
| R14 | 14 | ITEM29 | 29 |
| R15 | 15 | ITEM30 | 30 |

FIG. 5

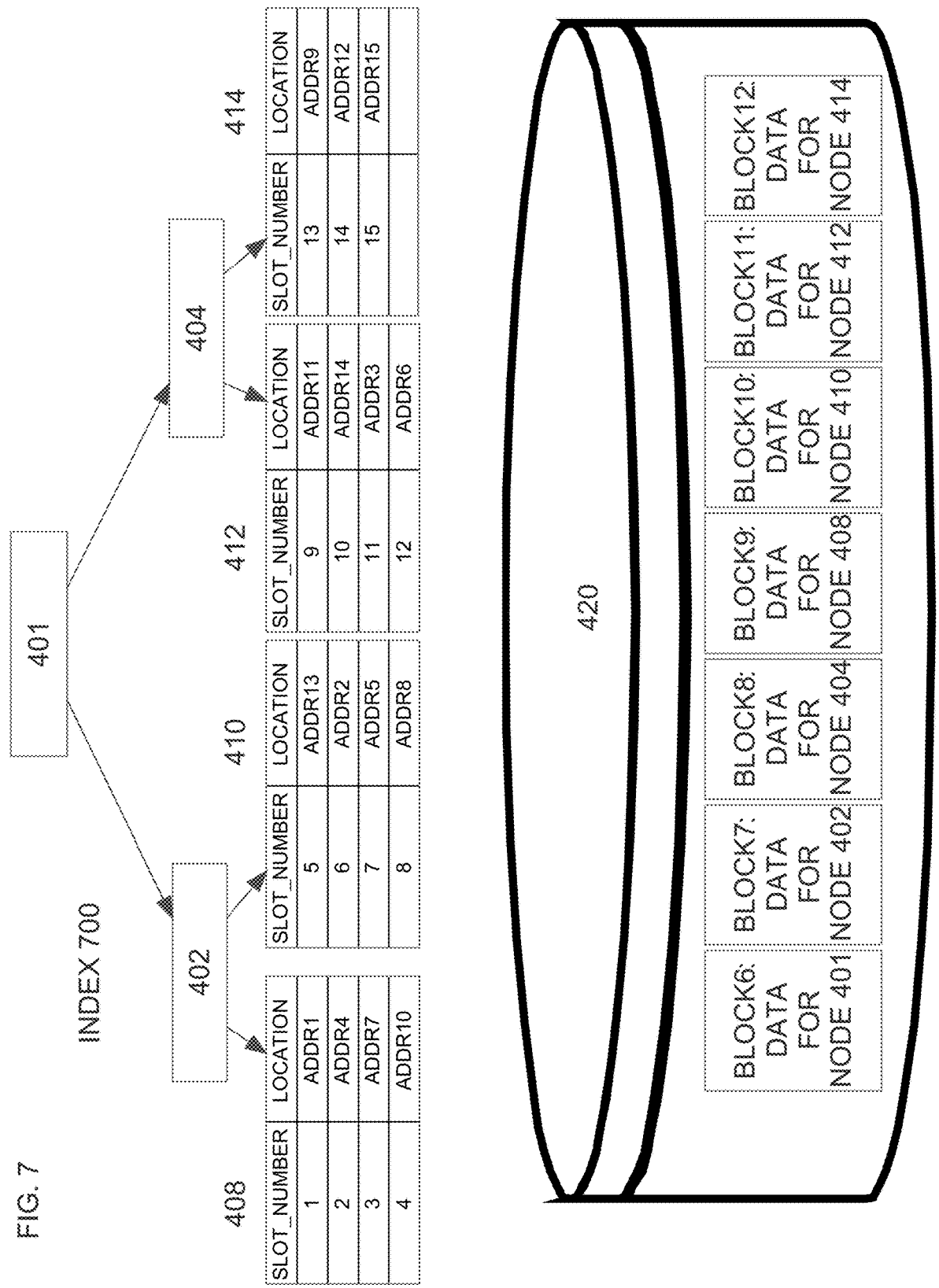

Figure 8A: Sequential assignment of rows to blocks (first 10 rows are shaded)

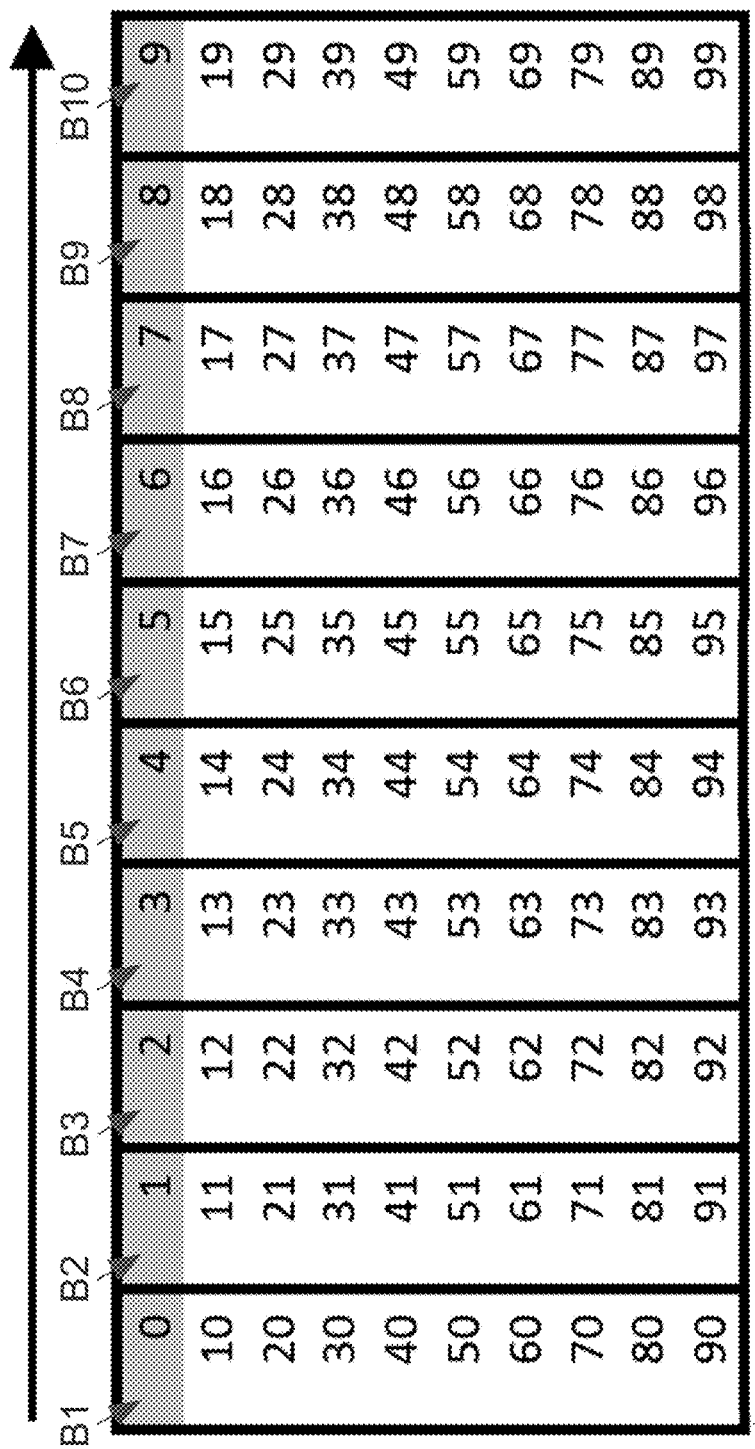
Figure 8B: Round robin assignment with unlimited dispersion (N=1, first 10 rows are shaded)

NUMBER OF SUB-RANGES (X) = 5
SIZE OF EACH ROUND-ROBIN BLOCK SET (N) = 2 BLOCKS

| B1 | B2 | B3 | B4 | B5 | B6 | B7 | B8 | B9 | B10 |
|----|----|----|----|----|----|----|----|----|-----|
| 0  | 1  | 20 | 21 | 40 | 41 | 60 | 61 | 80 | 81  |
| 2  | 3  | 22 | 23 | 42 | 43 | 62 | 63 | 82 | 83  |
| 4  | 5  | 24 | 25 | 44 | 45 | 64 | 65 | 84 | 85  |
| 6  | 7  | 26 | 27 | 46 | 47 | 66 | 67 | 86 | 87  |
| 8  | 9  | 28 | 29 | 48 | 49 | 68 | 69 | 88 | 89  |
| 10 | 11 | 30 | 31 | 50 | 51 | 70 | 71 | 90 | 91  |
| 12 | 13 | 32 | 33 | 52 | 53 | 72 | 73 | 92 | 93  |
| 14 | 15 | 34 | 35 | 54 | 55 | 74 | 75 | 94 | 95  |
| 16 | 17 | 36 | 37 | 56 | 57 | 76 | 77 | 96 | 97  |
| 18 | 19 | 38 | 39 | 58 | 59 | 78 | 79 | 98 | 99  |

Figure 8C: Round robin assignment with limited dispersion (N=2, first 10 rows are shaded)

NUMBER OF SUB-RANGES (X) = 2
SIZE OF EACH ROUND-ROBIN BLOCK SET (N) = 5 BLOCKS

| B1 | B2 | B3 | B4 | B5 | B6 | B7 | B8 | B9 | B10 |
|---|---|---|---|---|---|---|---|---|---|
| 0 | 1 | 2 | 3 | 4 | 50 | 51 | 52 | 53 | 54 |
| 5 | 6 | 7 | 8 | 9 | 55 | 56 | 57 | 58 | 59 |
| 10 | 11 | 12 | 13 | 14 | 60 | 61 | 62 | 63 | 64 |
| 15 | 16 | 17 | 18 | 19 | 65 | 66 | 67 | 68 | 69 |
| 20 | 21 | 22 | 23 | 24 | 70 | 71 | 72 | 73 | 74 |
| 25 | 26 | 27 | 28 | 29 | 75 | 76 | 77 | 78 | 79 |
| 30 | 31 | 32 | 33 | 34 | 80 | 81 | 82 | 83 | 84 |
| 35 | 36 | 37 | 38 | 39 | 85 | 86 | 87 | 88 | 89 |
| 40 | 41 | 42 | 43 | 44 | 90 | 91 | 92 | 93 | 94 |
| 45 | 46 | 47 | 48 | 49 | 95 | 96 | 97 | 98 | 99 |

Figure 8D: Round robin assignment with limited dispersion (N=5, first 10 rows are shaded)

DEQUEUE LOG TABLE 900

| SLOT_NUMBER | USER_ID | DEQUEUE TIME |
|---|---|---|
| SLOT_NUMBER 1 | SUBSCRIBER 1 | T1 |
| SLOT_NUMBER 1 | SUBSCRIBER 2 | T2 |
| SLOT_NUMBER 2 | SUBSCRIBER 2 | T3 |
| SLOT_NUMBER 1 | SUBSCRIBER 3 | T4 |
| SLOT_NUMBER 2 | SUBSCRIBER 4 | T5 |
| SLOT_NUMBER 3 | SUBSCRIBER 1 | T6 |
| SLOT_NUMBER 3 | SUBSCRIBER 2 | T7 |

FIG. 9

AVOIDING HOT SPOTS DURING INGEST WHERE INGEST ORDERING MUST BE PRESERVED

FIELD OF THE INVENTION

The present invention relates to systems in which electronic items are concurrently produced and ingested and, more specifically, to techniques for avoiding hot spots during ingest where ingest ordering must be preserved.

BACKGROUND

Certain software applications durably capture input data and then asynchronously process (and optionally discard) the ingested data as soon as possible in a first-in, first-out (FIFO) manner. FIG. 1 illustrates is a high-level block diagram illustrating such a FIFO system 100. Referring to FIG. 1, the entities that provide the items are illustrated as producers 102, and the entities that consume the items are illustrated as consumers 104. Durable storage 106 stores the items until the items are processed by all consumers 104 that are interested in the items. Durable storage 106 effectively serves as a buffer that allows the rate of item consumption to vary independently of the rate of item ingestion. After ingestion and prior to consumption, the items are stored on durable storage 106 in some form of data containers 108. The efficiency of system 100 will vary greatly based on the nature of data containers 108 and the manner in which the ingestion and FIFO consumption are handled.

A countless number of systems operate in the FIFO manner illustrated in FIG. 1, including, for example, messaging systems like JMS message brokers; workflow systems that support asynchronous requests; systems that process sensor readings and other Internet of Things (IoT) streams; and e-commerce systems that support flash sales with limited inventory. The techniques described herein are not limited to any particular type of FIFO system.

Depending on the FIFO system involved, the high-speed ingest throughput may continue for a long period of time (e.g., several months or years) or for a short period (e.g., a few minutes or hours). The ingested data may be retained for the minimal amount of time needed to process it fully or for some longer user-specified amount of time. To achieve high ingest throughput, multiple sessions may be used to ingest data. In addition to the ingest workload, in these FIFO-based applications, one or more consumers create a workload when processing each ingested item exactly once. A given consumer may be processing newly ingested data or may be processing data ingested hours, days, or months ago.

When processing must be done for a consumer in a FIFO manner, the bookkeeping that ensures each item is processed exactly once by the consumer has a logical and usually physical FIFO characteristic. To achieve high processing throughput, multiple sessions may be used to process ingested data on behalf of a single consumer. In many cases, it makes sense to run these FIFO applications on a database server to exploit database functionality such as transactions and/or to integrate with data already in the database.

Unfortunately, the workloads of highly-concurrent FIFO ingest and FIFO processing applications are inimical to efficient processing in databases because of their tendency to produce hot spots. The hot spots that occur in such FIFO systems often include both hot index blocks and hot data blocks. For example, assume that a conventional relational table 200, as illustrated in FIG. 2, is used as the data container for durably storing items in a FIFO system. When storing a new item in the relational database table 200, the database server often selects a storage location on durable storage that is adjacent to the item that was most recently stored in the table. That is, new row storage is allocated contiguously. Consequently, consecutively inserted items are often stored on the same disk block. In the example illustrated in FIG. 2, five items have been inserted into queue table 200, each of which is stored in its own row. In the illustrated example, the database server has chosen to store all five rows in the same data block 202.

For the purpose of illustration, examples shall be given herein where each disk block is protected by a single dedicated latch. However, the techniques described herein are equally applicable to situations where a single latch protects multiple disk blocks, as well as cases in which multiple latches protect disjoint sections of the same disk block. Regardless of the latch-to-block mapping, storing consecutively inserted items in the same disk block does not necessarily create a problem when a single session is doing all of the insertions, because that single session can simply obtain all necessary exclusive-mode latches, and perform the desired insertions. For example, when a single latch covers data block 202, the single session can obtain that latch in exclusive mode and then perform all five insertions. However, lock contention problems arise when multiple ingest sessions concurrently attempt to insert items into a table, and the same disk block is chosen for storing those consecutive items. For example, if each of items 1-5 is being inserted by a distinct ingest session, the fact that the rows for those five items are all in the same data block 202 will result in contention among the five ingest sessions for the exclusive-mode latch for block 202. Under these circumstances, the block 202 becomes "hot" because multiple entities are contending for the exclusive-mode latch thereto.

Not only do conventional relational tables experience hot blocks when used as FIFO buffers, but indexes that are built on those relational tables may also experience hot index blocks. Specifically, to enable FIFO consumption of the items in a relational table, the table typically includes a sequence-number column that stores a value that indicates the sequence in which the items were ingested. For example, queue table 200 has column "SEQ#". To speed up the FIFO consumption, an index may be built on the sequence-number column and used by the consumers 104 to perform index range scans to access the items in the order indicated by the sequence numbers.

Ordinarily, the logical location of an entry in an index does not depend on when the entry was inserted into the index. The logical location of an index entry depends solely on the value(s) of the indexed column(s) in the row associated with the index entry. Further, the relevant exclusive-mode latch (or other synchronization mechanism) on an index block for an index entry does not depend on the data block containing the row. The relevant exclusive-mode latch depends only on the index block being modified. However, the insert pattern for FIFO ingest is sequential, which translates into sequential inserts into the index. This pattern means inserts close in time will typically need to modify the same index block, which in turn leads to contention on the exclusive-mode latch for the index block. Referring again to FIG. 2, index 210 represents an index whose index key is the sequence-number column of queue table 200. Index 210 has one root node 212 and two leaf nodes 214 and 216. For the purpose of explanation, it shall be assumed that leaf node 214 includes the index entries for the first five rows ingested into queue table 200, and disk block 204 corresponds to leaf node 214. Because the five rows have consecutive sequence numbers, the index entries for the five rows will be logically consecutive within index 210. Further, because those index entries are inserted sequentially into the index, it is common for the database server to store them adjacent to each other on disk. In the illustrated embodiment, the index entries for the first five rows of queue table 200 have all been stored in the same disk block 204, which corresponds to leaf node 214. If each of the first five items is inserted into queue table 200 by a different session, those five sessions will have contention both with respect to the exclusive-mode latch of block 202 for inserting their respective rows in queue table 200, but also with respect to the exclusive-mode latch for block 204 for inserting the corresponding index entries into index 210. As illustrated by this example, high-speed ingest into an indexed table creates an index hot spot, in addition to a data block hot spot.

One way to avoid hot index blocks for right-growing indexes is to use a reverse index in which the bytes, nibbles, or bits in the indexed column(s) are reversed before they are added to the index. Reverse byte indexing is described, for example, in U.S. Pat. No. 5,956,705. Unfortunately, reverse byte indexing techniques are not useful for the sequence-number indexes of queue tables because the byte, nibble, or bit reversal prevents index range scans of the index, which is the primary use for which the index on the sequence-number column is built. The same shortcoming applies to a hash index.

Index maintenance during ingest also consumes CPU resources and generates database redo. These overheads decrease the maximum ingest throughput achievable on a given database server with a given I/O subsystem. Having multiple indexes (e.g., a normal index along with either a reversed index or a hash index) adds overhead for duplicate index maintenance. Finally, the index reversal techniques and the index hashing function are fixed item-dispersal patterns that can inadvertently co-locate a sequence of logically adjacent rows on the same index leaf block, especially when the number of rows in the table or table (sub)partition is small.

For the reasons given above, in a database system with a queue table, a hot data block can lead to latch waits when multiple database sessions update rows in the data block at the same time. For example, locking, processing, and updating ingested rows (or bookkeeping surrogates for such rows maintained for each consumer) in FIFO order can cause latch waits when multiple rows exist in the same data block.

One way to reduce hot blocks is to configure the database server to reduce the number of rows it will insert into any given data block. For example, if the database server is configured so that it will store no more than three rows in any given block, then the maximum number of ingest sessions that will contend for any given block is three. However, decreasing the maximum number of rows per block increases the amount of unused space in each block, and hence increases the wasted space per data block. Thus, the net result of decreasing the number of rows per block is spread the same amount of data over more disk blocks, which increases the amount of space wasted on disk, the amount of space wasted in the database server's buffer cache (when those blocks are loaded into volatile memory), and the I/O costs for transferring that data between the buffer cache and secondary storage.

Sharding, also called partitioning, can be used to ameliorate database hot spots when the FIFO requirement is not a strict FIFO requirement but can be relaxed to a set of independent FIFO shards. Sharding, however, has its own costs and complexities and can turn a single very hot spot that needs monitoring into multiple hot spots that need monitoring. Because sharding semantics are not always applicable, a more general solution is desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 5 is a block diagram of the queue table of FIG. 3 after the dummy rows have been updated to ingest 33 items;

FIG. 7 is a block diagram of an index built on the slot number column after adjustments to achieve physical row dispersal;

FIG. 8A is a block diagram that illustrates the sequence-number-to-disk-block mapping that is typical when a database server uses conventional techniques to select storage for new rows;

FIG. 8B is a block diagram that illustrates the sequence-number-to-disk-block mapping that results from unlimited dispersal of rows, according to an embodiment;

FIG. 8C is a block diagram that illustrates sequence-number-to-disk-block mapping that results from limited dispersal of rows with 5 row sub-ranges, according to an embodiment;

FIG. 8D is a block diagram that illustrates sequence-number-to-disk-block mapping that results from limited dispersal of rows with 2 row sub-ranges, according to an embodiment;

FIG. 9 is a block diagram of a dequeue log table that may be used by a consumer to keep progress of item consumption from a queue table, according to an embodiment.

DETAILED DESCRIPTION

Figure 1:
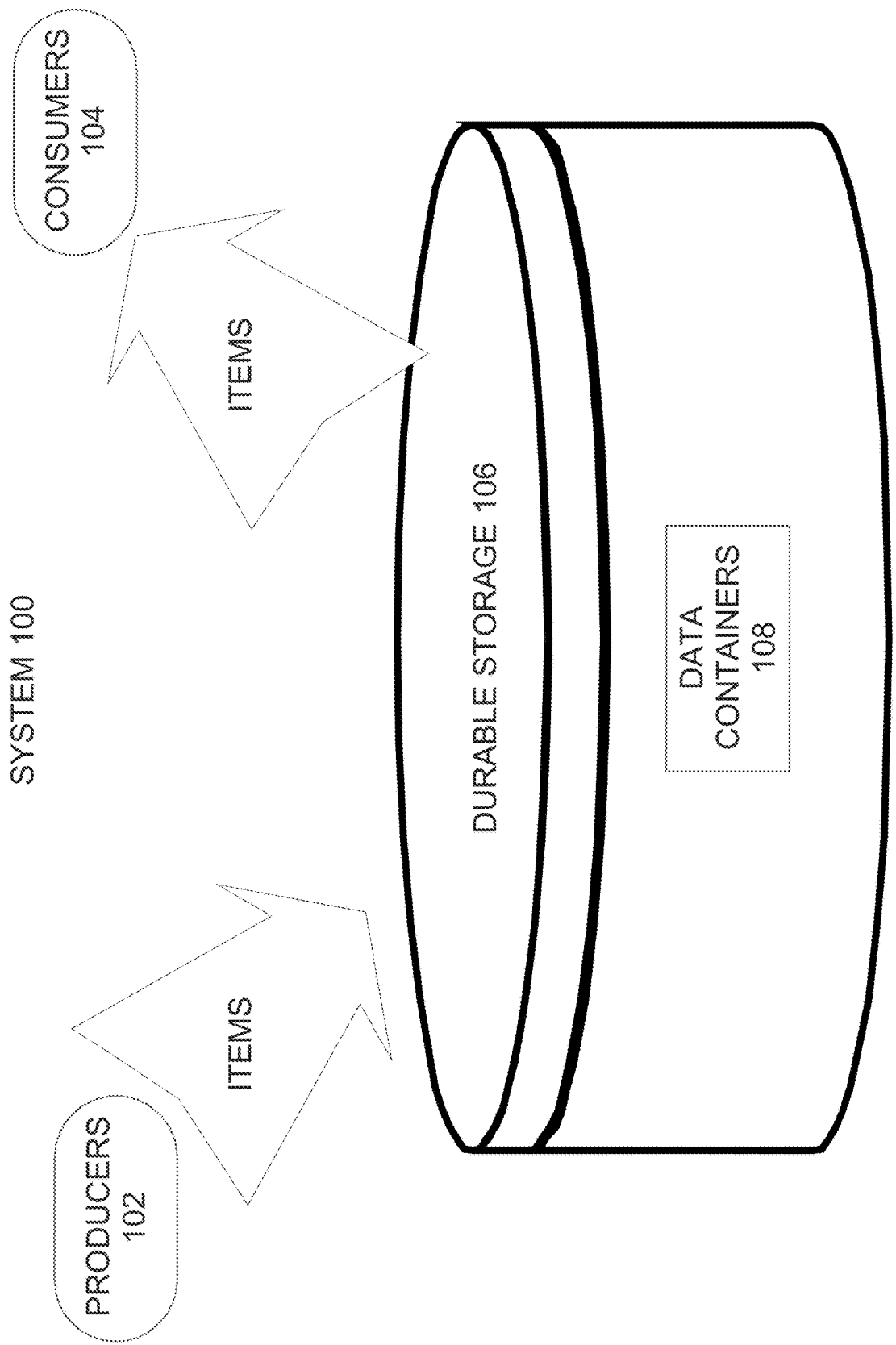
FIG. 1 is a block diagram of a FIFO system.
Figure 2:
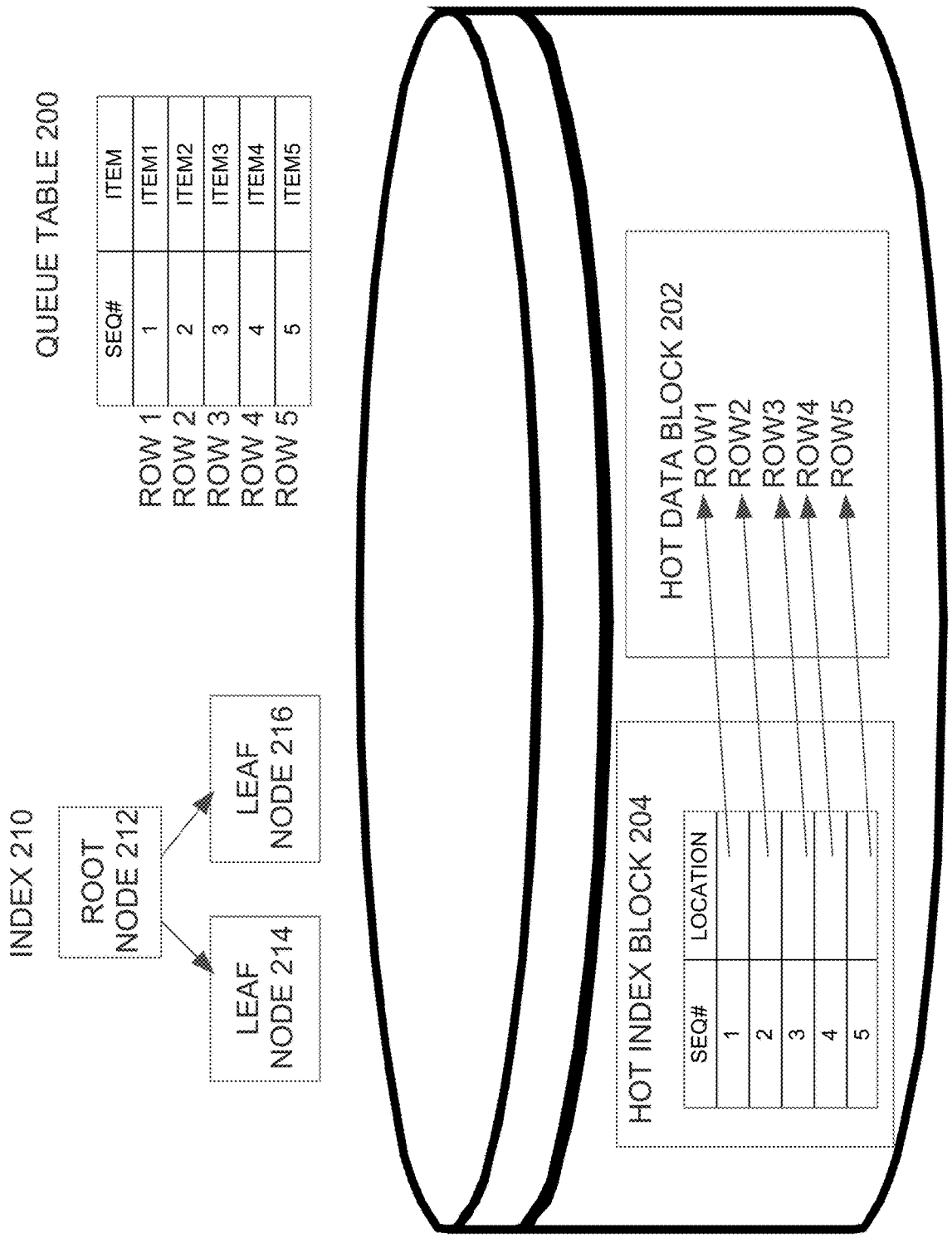
FIG. 2 is a block diagram that illustrates how may hot spots occur when a conventional indexed database table is used as a FIFO buffer.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As used herein, the term "item-dispersal pattern" refers to the pattern of storage locations used for consecutively ingested items. A "physically dispersed" item-dispersal pattern is a pattern that reduces lock contention by reducing the number of consecutively ingested items that are stored on the same block.

Techniques are described herein for achieving physically dispersed item-dispersal patterns in queue tables. The techniques achieve the physically dispersed item-dispersal patterns while retaining FIFO semantics, efficient data ingest, efficient data access, and low latency for both fixed and variable-size ingest data. Because consecutively inserted rows are written to physically dispersed locations on persistent storage, lock contention between concurrent ingest sessions is significantly reduced.

According to one embodiment, achieving a physically dispersed item-dispersal pattern involves creating a queue table (or table partition), and filling the queue table or partition with rows containing dummy data. The queue table may be a conventional relational database table that is used as a circular buffer. The queue table has a slot number column that includes sequence numbers that indicate the ingest sequence of the items stored in the table. Those sequence numbers also dictate the sequence in which the items should be consumed from the table to retain FIFO semantics. Before actual ingestion begins, the sequence numbers in the slot number column are adjusted to force a particular dispersal pattern. The adjusted sequence numbers may be inserted with the dummy rows themselves, or the slot number column values may be adjusted after dummy row insertion, so that dummy rows that are stored in the same block are never assigned consecutive sequence numbers.

An index may be built on the slot number column of the table. The index may be created either before or after the sequence number values of the dummy rows have been adjusted to achieve the desired physically dispersed item-dispersal pattern. After adjustment of the sequence number values and any index creation, normal ingestion of actual data may begin. However, rather than perform the ingestion by inserting new rows into the existing table, ingestion is performed by updating the non-indexed columns of the dummy rows. Because the rows are updated in the sequence dictated by the already-established sequence numbers, and those sequence numbers have been adjusted to produce a physically dispersed item-dispersal pattern, the locations of the updates are physically dispersed, thereby reducing contention for exclusive-mode latches on the data blocks.

Further, the values in the sequence-number column do not change after the initial adjustment. Because the queue table is used as a circular buffer, the storage space of existing rows is re-used without allocating new storage for new rows. Consequently, once built, there is no need for further updates to any index built on the slot number column. Since updates are not being performed on the index, there is no contention for exclusive-mode latches on the index blocks.

The creation of both the table and the index can be done by a background process in advance of the ingestion of actual data. Further, once created, the queue table or partition can be used repeatedly in a cyclic fashion without incurring client-observed index maintenance. Techniques are described hereafter for:

pre-building an index based on the sequence number values of dummy rows of a queue table, and treating that index as read-only during ingestion to avoid write contention of index blocks prior to ingestion, adjusting the sequence number values of the dummy rows to achieve a physically dispersed item-dispersal pattern to avoid write contention of data blocks during ingestion achieving dispersal patterns that balance the goal of reducing latch waits and the goal of reducing the size of the working set of the entities using the FIFO system accounting for unknown, variable, and/or changing item sizes when using a relation table as the cyclic FIFO buffer Terminology As mentioned above, the nature of the items that are ingested in a FIFO system will vary from implementation to implementation. The techniques described herein are applicable to any type of ingest items, including both fixed-size and variable-size items. Ingest items are also referred to hereafter as "ingest data" or "ingest rows". Further, examples given hereafter refer to a "FIFO table" or "queue table" with the understanding the term is not restricted to an entire database table but rather can also apply to a physical or logical partition or subpartition of a database table.

Pre-Creating a Populated Queue Table and Index

Figure 3:
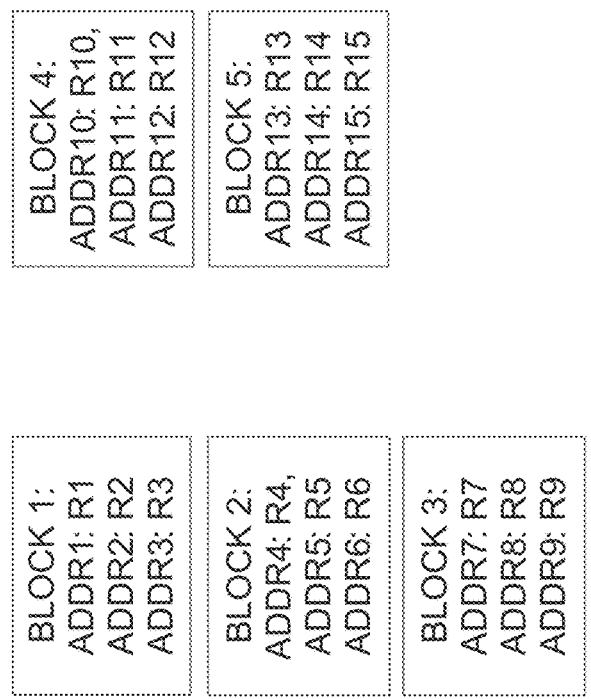
FIG. 3 is a block diagram of a queue table that is pre-populated with dummy rows, according to an embodiment.

Index hot spots for fixed-size ingest data may be eliminated by, prior to the ingestion of the actual ingest data, (a) pre-populating the queue table with dummy data that has the same fixed size as the ingest data, and (b) creating an index on the queue table either before or after prepopulation. Specifically, referring to FIG. 3, a queue table 300 is created and pre-populated with 15 dummy rows. The number of dummy rows with which the queue table 300 is prepopulated is the estimated maximum number of items that, at any given time, will be stored in the FIFO buffer that is implemented by queue table 300. For the purpose of illustration, queue table 300 has 15 dummy rows, but the actual number of dummy rows with which the queue table 300 would be pre-populated would typically be much higher.

As the 15 dummy rows are inserted into queue table 300, the database server that is performing the row insertions determines where each of the dummy rows is to be stored on durable storage (generally represented as disk 302). In the illustrated embodiment, the database server has chosen to store rows R1, R2, and R3 respectively at addresses ADDR1, ADDR2 and ADDR3 in block 1. Rows R4, R5 and R6 are respectively stored at addresses ADDR4, ADDR5 and ADDR6 in block 2. Rows R7, R8 and R9 are respectively stored at addresses ADDR7, ADDR8 and ADDR9 in block 3. Rows R10, R11 and R12 are respectively stored at addresses ADDR10, ADDR11 and ADDR12 in block 4. Rows 13, 14 and 15 are respectively stored at addresses ADDR13, ADDR14 and ADDR15 in block 5.

According to an embodiment, the insertion of the dummy rows may be performed by a single session. Consequently, even though consecutive rows R1 to R3 will be stored in the same block (block 1), there will be no contention over the exclusive-mode latch for block 1 during the insertion of those dummy rows.

An index on the column that contains the sequence number values may be added either before or after queue table 300 is populated with the dummy rows. As mentioned above, consumers may perform range scans on that index to consume the items in queue table 300 in the order in which the items were ingested.

Figure 4:
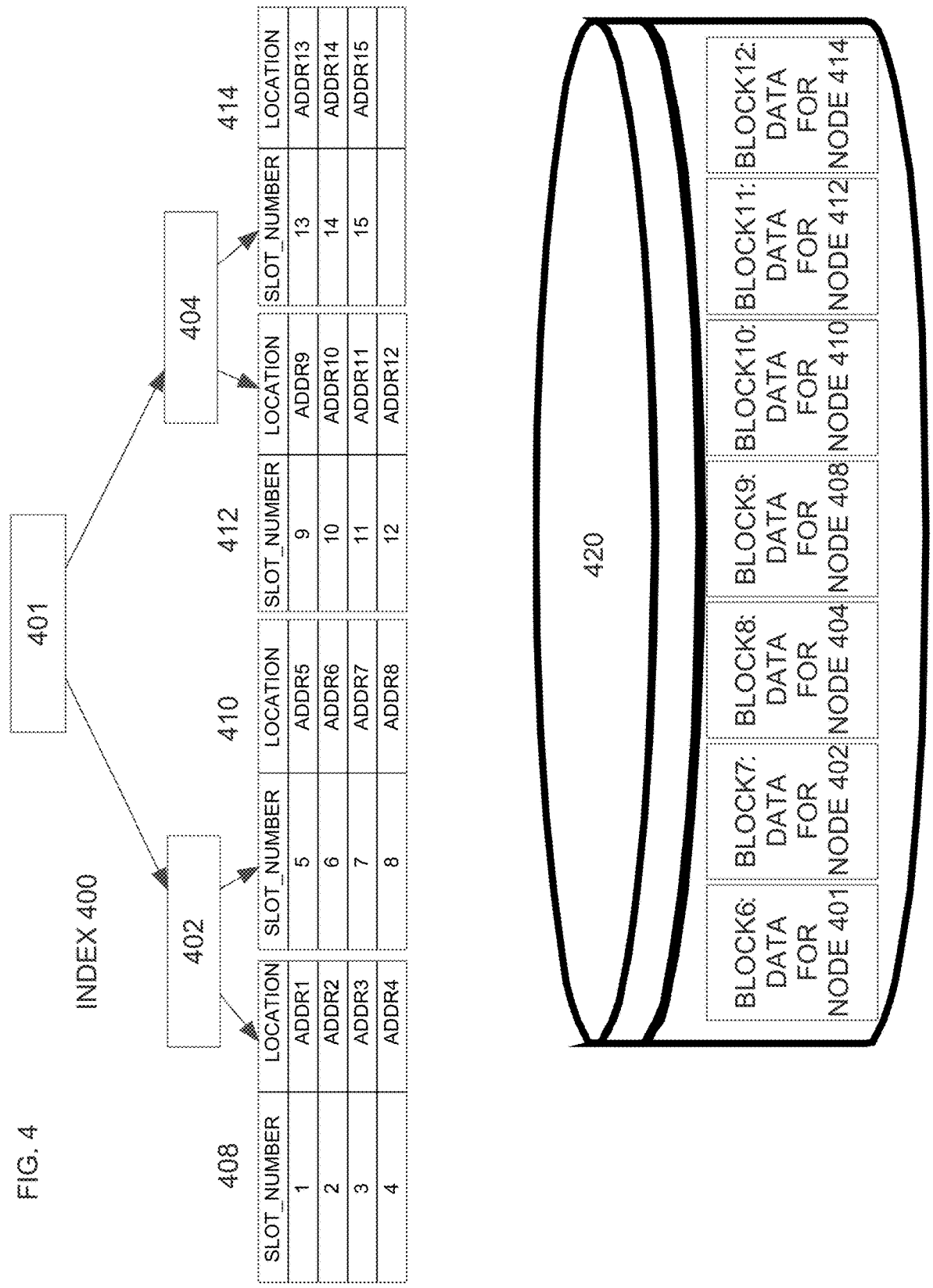
FIG. 4 is a block diagram of an index that is built on a slot number column of a queue table and used by consumers to consume items in sequential order from the queue table.

FIG. 4 illustrates an index 400 that is built on the SLOT_NUMBER column of queue table 300. Referring to FIG. 4, index 400 includes a root node 401, two intermediary nodes 402 and 404, and four leaf nodes 408, 410, 412 and 414. Each leaf node stores up to four index entries, where each index entry indicates a slot number and the location, on disk 302, of the dummy row that corresponds to that slot number. Specifically, leaf node 408 includes entries for slot numbers 1-4. The entries for slots 1, 2, 3 and 4 respectively indicate addresses ADDR1, ADDR2, ADDR3 and ADDR4. Similarly, leaf node 410 includes entries for slot numbers 5-8. The entries for slots 5, 6, 7 and 8 respectively indicate addresses ADDR5, ADDR6, ADDR7 and ADDR8. In a similar manner, leaf nodes 412 and 414 indicate the addresses that correspond to slots 9-15.

In the illustrated embodiment, blocks 6-12 of disk 420 respectively store the actual data that represent nodes 401-414. Disk 420 may or may not be the same disk (disk 302) used to store the data for the queue table 300. Similar to table 300, index 400 may be built by a single session (which may be the same session that populates table 300). Consequently, even though the data for adjacent index entries are stored in the same block of disk 420, the creation of index 400 need not involve contention for those index blocks.

Ingesting into a Pre-Populated Pre-Indexed Table

After table 300 has been pre-populated with dummy rows and index 400 has been created, the database server uses the queue table 300 as a potentially infinite ring buffer. During ingest of the actual data, the inserted dummy data is ignored, and index 400 is treated as read-only. Specifically, during the ingest of actual data, instead of inserting each new item as a new row, the database server updates each existing row in place, in the sequence dictated by the values in the SLOT_NUMBER column.

Specifically, assume that the database server has already ingested X items. Instead of inserting a new row with the sequence number X+1, the database server updates the already-existing row whose SLOT_NUMBER value is (X+1) MOD N, where N is the total number of rows in the queue table. For example, when ingesting the first item, the database server updates R1 because R1 is associated with slot number 1 (1 MOD 15=1). On the other hand, when ingesting the 20$^{th}$ item, the database server updates R5, because R5 is associated with slot number 5 (20 MOD 15=5).

According to some embodiments, queue table 300 includes an additional column to store an indication of the actual sequence number of each ingested item. FIG. 5 illustrates an example of queue table 300 with SEQ# column. More specifically, FIG. 5 illustrates how queue table 300 would be populated after 33 items have been ingested. Specifically, during the first cycle, items 1-15 were stored in the rows associated with slot numbers 1-15, respectively (overwriting the dummy rows). During the second cycle, items 16-30 were stored in the rows associated with slot numbers 1-15, respectively (overwriting the items from the first cycle). During the third cycle, items 31-33 have been stored in the rows associated with slot numbers 1-3, respectively, and the next item (item 34) will be stored in the row associated with slot 4 (because 34 MOD 15=4).

Avoidance of Hot Index Blocks During Ingestion

As explained above, the index on the slot number column of the index table is built prior to ingest of the actual data. During ingest, the slot number column is treated as read-only, so no further updates are made to the index. Because no updates are made to the index, there is no contention for the exclusive-mode latches to index blocks, regardless of how many sessions are concurrently ingesting items. Consumers may continuously use the existing index to perform range index scans in order to consume the ingested items in the sequence in which they were ingested.

For example, during a first index scan of index 400, a consumer reads the data for leaf node 408 from block 9 to identify the locations for the first four ingested items, and may use that information to consume those items in their ingest order. Similarly, the consumer reads leaf nodes 410 (from block 10), then 412 (from block 11), then 414 (from block 12) to locate and consume ingested items 5 to 15.

During a second index scan of index 400, the same consumer reads the same leaf nodes, in order, to locate and consume ingested items 16-30. Likewise, during the third index scan, the consumer reads the same leaf nodes, in order, to locate and consume ingested items 31-45. As illustrated by this example, as long as new items are stored in queue table 300 in an order that is based on the slot number values, the sequence of the index entries in index 400 will continue to correspond to the ingest time ordering of the corresponding entries. Further, as long as those new items are written over the previously-existing rows, the addresses reflected in the index 400 will continue to be accurate.

Eliminating Hot Data Blocks by Adjusting Slot Values

Ingesting into a pre-populated, pre-indexed table eliminates hot index blocks during ingest, but is not sufficient to eliminate hot spots in the queue table itself. For example, returning to FIG. 3, the first three items ingested in table 300 will be stored in rows R1, R2 and R3 because those rows correspond to slots 1, 2 and 3. Unfortunately, rows R1, R2 and R3 are all stored in the same block (block 1). Consequently, if each of the first three items is being ingested by a different session, then those sessions will all be contending for the exclusive-mode latch to block 1.

Therefore, according to one embodiment, data block hot spots are eliminated by dispersing logically adjacent FIFO rows across distinct data blocks. For example, the database server may cause the data for the row associated with slot 2 to be stored in a different disk block than the data for the row associated with slot 1. Similarly, the database server may cause the data for the row associated with slot 3 to be stored in a different disk block than the data for the row associated with slot 2. Because the data for each of the three consecutive rows is being stored in a different data block, the sessions that are storing those rows need not contend with each other for the necessary exclusive-mode latches.

According to one embodiment, the physical dispersal of logically adjacent FIFO rows is performed by, while the queue table is being populated by dummy rows, selecting the values for the slot number column of the queue table to achieve the desired item-dispersal pattern. For example, assume that a round-robin item-dispersal pattern is desired. In the five-block scenario illustrated in FIG. 3, a round-robin item-dispersal pattern would cause the first five rows to be stored respectively in blocks 1, 2, 3, 4 and 5. The second five rows would then be stored respectively in blocks 1, 2, 3, 4 and 5. This storage pattern would continuously repeat for the entire ingest operation.

Figure 6:
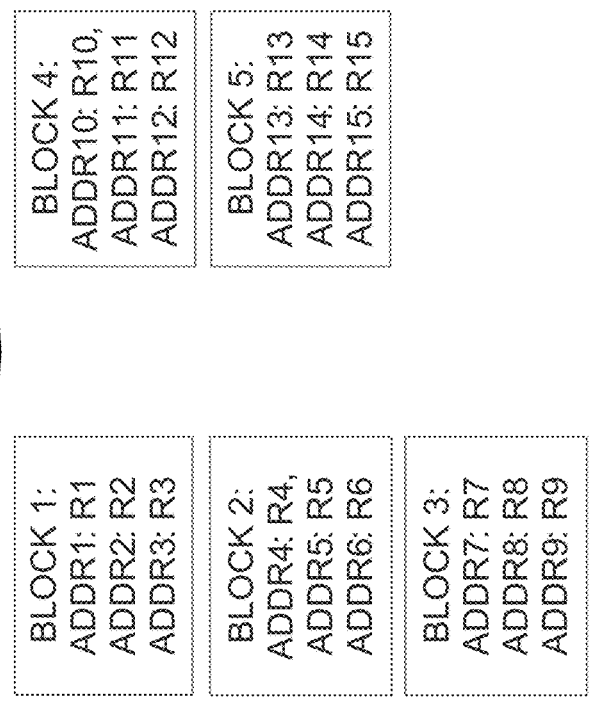
FIG. 6 is a block diagram of a queue table after the slot number column has been adjusted to achieve physical row dispersal, according to an embodiment.

To achieve such an item-dispersal pattern, the SLOT_NUMBER column of queue table 300 may be populated as illustrated in FIG. 6. Significantly, the SLOT_NUMBER values illustrated in FIG. 6 do not correspond to the actual insert sequence of the dummy rows. Instead, the SLOT_NUMBER values are selected to achieve physical row dispersal, intentionally spreading out sequence inserts. Sequence number values that are selected to achieve a particular physical dispersal pattern are referred to herein as "adjusted sequence numbers" because they do not necessarily reflect the row insertion sequence.

Due to the adjusted sequence/slot numbers, when actual items are ingested into table 300 in the sequence that is based on the existing slot numbers, sequentially-ingested items will not be stored in the same block. Referring again to FIG. 6, the first item will be inserted into row R1 in block 1 because R1 has slot number 1. The second item, on the other hand, will be inserted into row R4 in block 2 because R4 has slot number 2. The third item will be inserted into row R7 in block 3 because R7 has slot number 3. As can be seen by this example, when consecutively ingested items are ingested using different sessions, those sessions do not have to compete for the exclusive-mode latch because, due to the slot number assignment, those sessions will never be writing to the same disk block.

An index that is built on the slot number column after the dispersal-producing slot number adjustments may be used by consumers to consume the ingested items. FIG. 7 is a block diagram of an index 700 that is built on the SLOT_NUMBER column of queue table 300 after the slot number values have been adjusted in the manner illustrated in FIG. 6. Index 700 is similar to index 400 except for the addresses to which the index entries point. Specifically, the addresses to which the index entries point reflects the dispersal pattern created by the slot number adjustments. Consequently, performing an index scan on index 700 would cause the consumers to read from blocks 1-5 in a round-robin manner.

FIGS. 8A and 8B are block diagrams that illustrate the difference between the sequence-number-to-disk-block mapping that is typical when the database server uses conventional techniques to select storage for new rows (FIG. 8A) and the sequence-number-to-disk-block mapping that is produced by modifying slot numbers to achieve a round-robin row dispersal (FIG. 8B).

Figure 10:
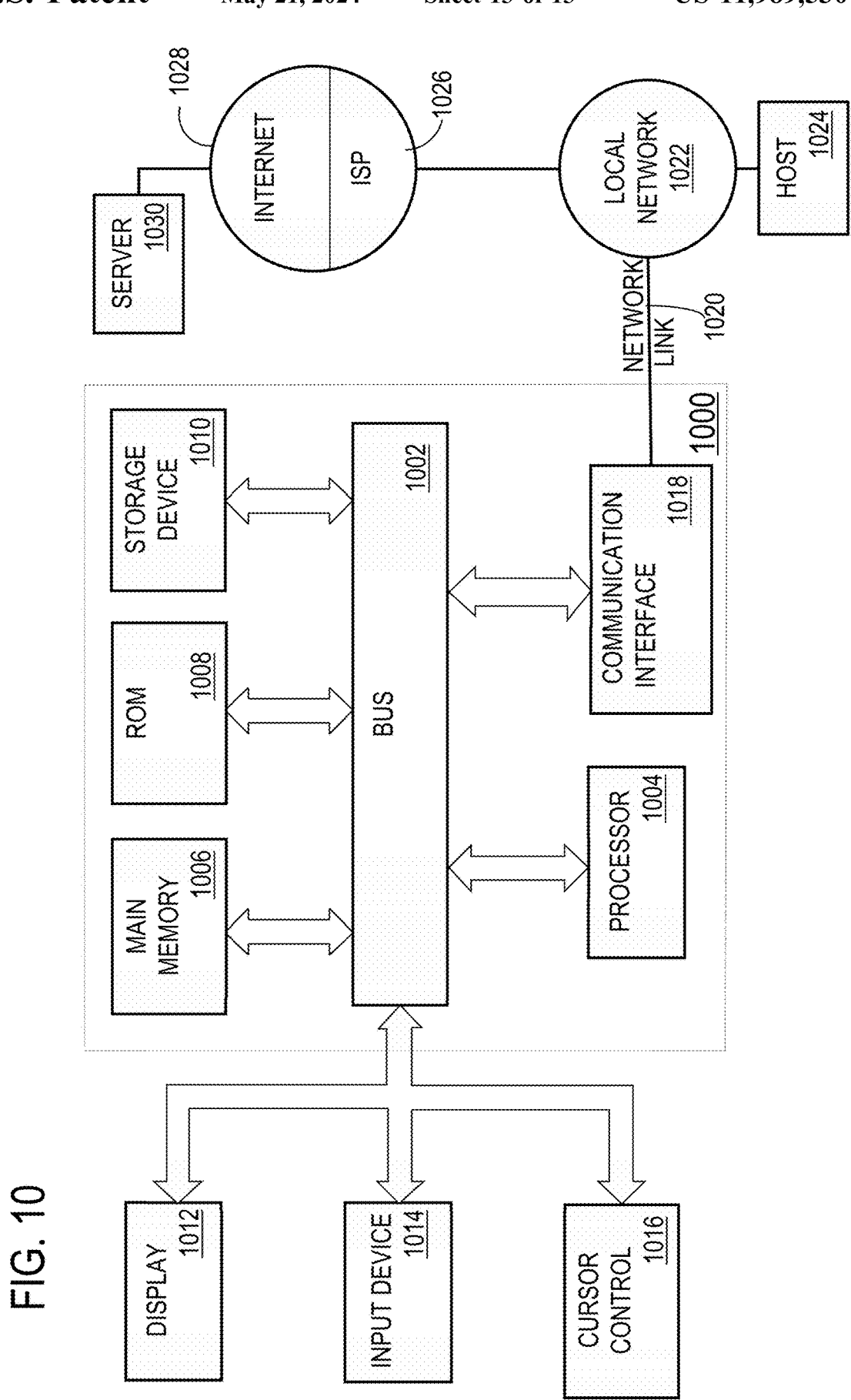
FIG. 10 is a block diagram of a computer system upon which the physical row dispersal techniques described herein may be implemented.

In the example given in FIG. 8A, 10 fixed-size rows fit in each data block so 100 rows fit into 10 data blocks (B1 to B10). As shown in FIG. 8A, a naive, single-threaded INSERT is likely to insert rows 0-9 (with respective slot numbers 0-9) in the first block, rows 10-19 (with slot number 10-19) in the second block, and so on. The last data block (B10) is likely to contain rows 90-99. The assignment of rows to data blocks that is illustrated in FIG. 8A is a "sequential assignment." When the rows of a queue table reflect the sequential assignment pattern illustrated in FIG. 8A, updating logically adjacent FIFO rows will usually update rows in the same data block and lead to latch waits when there are multiple database sessions doing such updates.

In contrast, FIG. 8B illustrates an "unlimited dispersal" of FIFO rows across data blocks, resulting in a round-robin dispersal pattern. Referring to FIG. 8B, a sophisticated single-threaded INSERT can put rows with SLOT_NUMBERS 0, 10, 20, . . . , 90 on the first data block (B1), rows with SLOT_NUMBER 1, 11, . . . , 91 on the second data block (B2), and so on as shown in FIG. 8B. Rows with SLOT_NUMBER 9, 19, . . . , 99 are put on the last data block (B10). The dispersal pattern illustrated in FIG. 8B has the benefit that up to ten ingest sessions can be concurrently inserting items into the queue table without incurring exclusive-mode latch contention.

Limited Dispersal of Rows

When rows are dispersed in a round-robin fashion across all blocks of the queue table (i.e. unlimited dispersal), the number of ingest sessions can equal up to the number of disk blocks that are used by the queue table, while still avoiding exclusive-mode latch contention. However, unlimited dispersal has its drawbacks. For example, assume that the queue table is stored across 10,000 blocks. In such a scenario, after a block is accessed, 9,999 other blocks will be accessed before that same block is accessed again. Consequently, in systems that cache data blocks, the utility of the cache is severely diminished because blocks will typically be flushed from cache (to make room for the other 9,999 blocks) before they are accessed again.

The "working set" of a process collectively refers to the data structures the process is actively using, regardless of where those data structures reside in the memory hierarchy at any one moment in time. In the present context, the working set of a consuming application corresponds to the set of blocks from which the consuming application is reading items. The larger the size of the working set, the less likely any given block will be in cache when the consuming application needs to read an item from the block.

Therefore, according to an embodiment, techniques are provided to control the dispersal of rows to provide a tradeoff between (a) the goal of reducing latch waits and (b) the goal of reducing the working set size of consumers. Those techniques are referred to herein as "limited dispersal". Limited dispersal divides the row range of the queue table into X contiguous subranges and partitions the queue table's data blocks into X disjoint subsets of the same size. Each of the X subsets of blocks is referred to a round-robin block set. Once the rows and blocks have been divided in this manner, limited dispersal of rows is accomplished by performing unlimited dispersal (e.g., a round robin assignment) of each subrange of rows across a single round-robin block set, storing only that subrange of rows. If M is the total number of data blocks in the queue table, M/X data blocks are used for each round-robin block set.

For example, assume that:
The total number of blocks in the queue table (M) is 10 data blocks
The number of row subranges (X) is 5
The number of ingest rows is 100, and
10 rows fit in each data block.

Based on these assumptions, the size of each round-robin block set (N) is M/X=10/5=2 data blocks. In this example, a sophisticated single-threaded INSERT can put rows with SLOT_NUMBER 0, 2, 4, . . . , 18 on the first data block, rows with SLOT_NUMBER 1, 3, 5, . . . , 19 on the second data block, rows with SLOT_NUMBER 20, 22, 24, . . . , 38 on the third data block, rows with SLOT_NUMBER 21, 23, 25, . . . , 39 on the fourth data block, and so on as shown in FIG. 8C. The last data block contains rows with SLOT_NUMBER 81, 83, 85, . . . , 99.

Referring to FIG. 8C, the first two data blocks (B1 and B2) together are the first round-robin block set. The first round-robin block set contains the first contiguous subrange: all rows with SLOT_NUMBER from 0 to 19. The third and fourth data blocks (B3 and B4) together are the second round-robin block set and contain the second contiguous subrange: all rows with SLOT_NUMBER from 20 to 39.

Each of the other three contiguous subranges is similarly assigned to a round-robin block set.

The size (N) of each round-robin block set dictates both (a) the amount of parallelism that can be used to ingest items while still avoiding exclusive-mode latch contention, and (b) the working set size of consumers. Thus, different sizes may be used based on the desired balance between ingest concurrency and reduced working set size. For example, while FIG. 8C illustrates limited dispersal with 5 contiguous subranges resulting in a round-robin block set size of 2 blocks, FIG. 8D illustrates limited dispersal with 2 contiguous subranges resulting in a round-robin block size set size of 5 blocks. Although the number of rows per data block and the number of data blocks are the same in the examples given in FIGS. 8A-8D, the techniques described herein are not limited to those circumstances. Thus, the total number of data blocks in the queue table (M) need not have any particular relationship to the number of rows that fit into any given data block.

Consumers/Subscribers

As mentioned above, as producers are storing items in a queue table, one or more subscribers (also referred to as "consumers") are reading items from the queue table. To ensure FIFO semantics, the subscribers consume the items in the same sequence in which the items were stored into the queue table. The FIFO consumption of items by the subscribers is facilitated by performing range scans on the index that is built on the slot number column.

In order to track the progress of their consumption operations, the database system may maintain a dequeue log table, such as the dequeue log table 900 illustrated in FIG. 9. Referring to FIG. 9, it contains columns: SLOT_NUMBER, USER_ID, and DEQUEUE TIME. The SLOT_NUMBER column indicates the item, within the queue table, to which the row corresponds. The USER_ID indicates a database user (subscriber) that has dequeued the item from the queue table. The DEQUEUE TIME column indicates the time at which the specified user dequeued the specified item. The dequeue log table 900 may contain additional columns (not shown) for conveying additional information, such as how many retries had to be performed to successfully dequeue the item, the transaction ID of the database transaction that performed the dequeuing, etc.

According to an embodiment, for each item with N subscribers, there will be N rows in the dequeue log table 900, one for each subscriber that has dequeued the item. Thus, each row in the dequeue log table 900 corresponds to an item/subscriber combination, and indicates that the specified item has been consumed/dequeued by the specified subscriber. In an alternative embodiment, rather than have a single dequeue log table for all subscribers, each subscriber may maintain its own dequeue log.

Similar to the queue table, row dispersal techniques may be employed to physically disperse the rows of the dequeue log table(s). Physically dispersing the rows of the dequeue log tables may be particularly helpful to avoid lock contention when multiple sessions are dequeuing for a single subscriber. After the rows have been physically dispersed, the dequeue log tables may be used as a circular buffer in which existing rows are overwritten by updates, rather than inserting new rows. To facilitate point updates to the dequeue log table(s), indexes may be built on the SLOT_NUMBER column of each dequeue log table. After the physical row dispersal, the indexes and the column on which the indexes are built are treated as read-only, in the same manner as described above with reference to the queue table and its index.

In addition to the dequeue log(s), the database server maintains a "low-water mark". The low-water mark indicates that all items below the low-water mark have been fully consumed (dequeued by all relevant subscribers), and can therefore be overwritten in the queue table. For example, if items 1-20, 22-30 and 35 have been fully consumed, the low-water mark would be 20, since item 21 has not yet been fully consumed. Once item 21 is fully consumed, the low-water mark will jump to 30, because after item 21 is consumed all items up to item 30 will have been fully consumed. Ingest sessions can only update rows that contain items that fall below the low-water mark. If no such rows are available, then the ingest sessions must wait, or additional storage is allocated to the FIFO system.

Changes in Storage Needs

In certain situations, it may be desirable to increase or decrease the amount of storage used by the queue table. For example, it may be desirable to increase the queue table storage capacity before reaching a situation in which producers stall because all rows of the queue table contain items that have not been fully consumed. Conversely, it may be desirable to decrease the queue table storage capacity when the consumers are fast enough that, at any given time, only a small fraction of the queue table has un-consumed items.

Various techniques may be used to increase and/or decrease the size of the queue table. For example, the queue table may be implemented as a partitioned table, where partitions are added or dropped as the storage requirements change. As each partition is created, it may be created in the manner described above (with dummy rows and physical row dispersal) to achieve the desired item-dispersal pattern. Each partition may have its own index, which is created as described above and treated as read-only once the sequence numbers have been adjusted to achieve the desired item-dispersal pattern.

As an alternative to adding and dropping partitions, the database server may simply create a new queue table having the desired new size in the background. Once created, the producers may simply switch over to the new table. Once the consumers have consumed all items from the old queue table, the consumers also switch over to the new queue table. Once all consumers have switched over to the new queue table (all items in the old queue table have been fully consumed), the old queue table may be dropped.

In yet another embodiment, a series of queue tables (a "buffer table set") may be used collectively as a single circular FIFO buffer. For example, producers may add items to queue table 1, then queue table 2, then queue table 3, and then return to adding items to queue table 1. Tables may be added or removed from the buffer table set on an as-needed basis. This scenario is similar to the partitioned table scenario, where partitions are added or removed on an as-needed basis. When a buffer table set is used in this manner, each buffer table is created using the techniques described herein, to avoid write contention for both index blocks and data blocks.

Handling Unknown Row Sizes

In the examples given above, it was assumed that the ingest row size was fixed. Given a known fixed row size, the queue table can easily be pre-populated with dummy rows having that fixed size. Once pre-populated in this manner, the ingested rows will fit exactly in the space occupied by the dummy rows. However, in some scenarios, the size of the ingest rows may be variable or not known ahead of time. Techniques are provided herein for handling situations in which the ingest row size is not known prior to the ingest operation.

According to one embodiment, the database server determines the range of ingest row sizes in advance (e.g., from a training run or preliminary testing). After determining the range of row sizes, the database server determines a dummy row size based on the range of row sizes, and inserts dummy rows having that size into a new queue table and precreates the index. According to one embodiment, the dummy row size is the average training run row size plus some safety factor (e.g., one or two standard deviations). In an alternative embodiment, the dummy row size may be the maximum row size encountered in the training run. In yet another embodiment, the dummy row size may be the maximum possible row size for ingest data given the data type(s) of the ingest items.

In some applications, the range of row sizes may not be known in advance or can vary with time. According to one embodiment, in these situations, the queue table is not initially pre-populated with dummy rows. Instead, the queue table is initially filled (in a "training run") with actual ingested data via SQL INSERT statements the first time it is used, and the index on SLOT_NUMBER is maintained. After the training run and before the rows in the queue table are overwritten with new inject data, the rows from the training run are consumed and the SLOT_NUMBER column is updated in a specific fashion, which disperses logically adjacent rows without actually moving any physical rows. The adjustments made to the values in the SLOT_NUMBER column in embodiments where the queue table is initially populated with actual ingest data are similar to those described above where the queue table is pre-populated with dummy rows. Specifically, the slot number values are revised to achieve the desired row item-dispersal pattern (unlimited or limited dispersal). Similar to the adjusted SLOT_NUMBER values used with dummy rows, this update involves index maintenance and can be done in the background when the rows in the queue table are not being accessed and are no longer needed.

After the SLOT_NUMBER value adjustment, the second and subsequent times the queue table is used for ingested data, a SQL UPDATE is used for each ingested row instead of a SQL INSERT. No index maintenance is required for the SQL UPDATE, because no indexed columns are updated. As long as the rows injected in subsequent runs are approximately the same size as the rows ingested in the training run, the subsequent rows will fit in the storage that was allocated to the queue table in the training run.

It may not always be desirable to simply reuse the rows that were created during the training run. For example, in some situations, the training run is used to obtain information about row size, but then a new queue table is created with dummy rows that have a size that is different from but based on the size of the rows that were inserted during the training run. For example, the new queue table may be created with dummy rows that are 20% larger (or 3 standard deviations larger) than the average or median size of the rows created in the training run. After the new queue table is populated with dummy rows, the rows of the new queue table may be physically dispersed by adjusting the values in the relevant slot number column in the manner described above.

Row Size Variation Over Time

If ingest row size varies with time, the rows in the queue table can be flushed via a SQL DELETE or a SQL TRUNCATE either periodically or when the actual range of row sizes deviates sufficiently from the expected range. If no statistics on recent or predicted ingest row size are available after flushing, the first usage of the queue table after flushing will be via INSERT statements (similar to a training run, described above), and subsequent usage until the next flush will be via UPDATE statements. If statistics on recent or predicted ingest row size are available after flushing, dummy rows with appropriate size can be inserted to pre-create the index entries.

If continuous ingest prevents flushing or UPDATE-based row dispersal, a generalized double-buffering approach can be used. For example, multiple queue tables, multiple physical partitions within a queue table, or multiple logical partitions in a queue table can be used so that flushing and UPDATE-based row dispersal occurs on a queue table or partition whose rows are not being accessed and no longer needed (whose items have been fully consumed).

In one embodiment, the database server maintains statistics about item size, and detects situations in which the size of items has deviated more than a threshold amount from the row size used by the queue table. In response to detecting such a situation, the database server may automatically create a new queue table, or a new queue table partition, using dummy rows that have a size that is based on those statistics. In the case where a new partition is added, a single queue table may have multiple partitions, where each partition has different-sized rows.

According to one embodiment, within each partition of a partitioned queue table, the slot/sequence numbers restart from the beginning value. For example, assume that each partition has 100 rows. The slot numbers in each partition may run from 0-99. In this scenario, metadata associated with each partition may indicate a starting offset to add to the slot numbers in the partition. For example, in an embodiment where each partition has 100 rows, 0 may be the offset added to the slot numbers in the first partition, 100 may be the offset added to the slot numbers in the second partition, etc. In such an embodiment, the sequence in which the partitions are used may be changed simply by adjusting the slot number offsets associated with the partitions.

Sharded FIFO Semantics

In addition to applications needing strict FIFO semantics, the techniques described herein can be applied to applications implementing sharded FIFO semantics. Rows in each shard can be dispersed independently. Row size statistics and predictions can be maintained per shard or globally across all shards. Each shard may have its own queue table, or each shard may have its own partition within a partitioned queue table.

Database-Resident Implementation

In a preferred embodiment, the techniques for causing physical row-dispersal described herein can be implemented by code inside the database server. In such an embodiment, physical row-dispersal may be specified by an annotation (e.g. a user directive specified with the SQL, a parameter associated with the session state, metadata associated with the queue table, etc.) or adaptive optimization.

In one embodiment, such a database-resident implementation can use the same SQL INSERT and UPDATE statements that shall be described hereafter to disperse rows, or can implement the specified assignment of rows to data blocks directly. A database-resident implementation can transparently preserve, institute, or alter row dispersal when a logical transfer of information is done between databases via utilities such as database export and database import or within a database via techniques such as (online) table reorganization.

Example SQL Statements for Physical Row Dispersal

In one embodiment, the physical row-dispersal techniques described herein can be implemented in an application on top of a stock relational database (one in which code for physical row dispersal is not database-resident). In such an embodiment, physical row dispersal may be performed using SQL statements such as those that shall be described hereafter.

As explained above, the techniques described herein improve performance and throughput by eliminating or dramatically reducing index maintenance overhead and by substantially reducing latch waits for FIFO-based applications involving concurrent ingest and updates. Example SQL statements that may be used to cause physical row dispersal, during the insertion of dummy rows, to achieve these benefits are described hereafter. Specifically, the SQL statements below assume that, as dummy rows are inserted, sequential row storage will be allocated contiguously. Consequently, to achieve physical row dispersal, the sequence numbers of consecutive rows are not sequential. Rather, the sequence number for each row is set to a value to achieve the desired row dispersal pattern.

Unlimited Dispersal of Rows

When the row size range is known, a single SQL INSERT statement can perform row dispersal. Here is the template for a zero-based SLOT_NUMBER that assumes the SLOT_NUMBER column is the last column in the table and implements a round-robin assignment of rows to data blocks:

```
INSERT INTO <ingest_table>
SELECT <dummy column data>,
(ROWNUM−1)*:B+(1−:B*:P)*FLOOR((ROWNUM−1)/:P)
FROM SYS.DUAL
CONNECT BY LEVEL <= :R
```

In this example, SYS.DUAL is a special table that has a single row. It is possible to cause the database server to evaluate any given SQL expression by selecting the SQL expression from SYS.DUAL. In the above INSERT statement template, the bind variable R is set to the total number of rows needed in the queue table, the bind variable B is set to the number of data blocks needed to contain R rows, and the bind variable P is set to the number of rows that fit in a single block. R must be an integral multiple of B, and R rows should completely fill B data blocks. Row assignments other than round robin may be achieved with different expressions for the SLOT_NUMBER column.

Limited Dispersal of Rows

To implement limited dispersal, one can modify the above INSERT statement appropriately and run the modified statement N times. In a preferred embodiment, a single SQL INSERT statement running once can perform limited dispersal:

```
INSERT INTO <ingest_table>
SELECT <dummy column data>,
(ROWNUM−1)*:B+(1−:B*:P)*FLOOR((ROWNUM−1)/:P)+
FLOOR((ROWNUM−1)/(:P*:B))*((:P*:B)−:B)
FROM SYS.DUAL
CONNECT BY LEVEL <= :R
```

In the above INSERT statement template, the bind variable B is set to the number of data blocks in each subset, the bind variable P is set to the number of rows in a data block, and the bind variable R is set to the total number of rows. R must equal N*B*P, where N is the number of subsets.

Handling Unknown Row Sizes

When the row size range is not known, a single SQL UPDATE statement can perform row dispersal when the number of rows is an integral multiple of the number of data blocks and completely fills the data blocks. In addition, the rows must have a sequential assignment as defined above. The UPDATE statement permutes the values in the SLOT_NUMBER column and leaves the other column values alone. Here is the template for a zero-based SLOT_NUMBER that effects a round robin assignment of rows to data blocks:

```
UPDATE <ingest_table>
SET slot_number =
FLOOR(slot_number*:B/:R) + :B*MOD(slot_number, :R/:B)
```

The bind variable R is set to the total number of rows, and the bind variable B is set to the number of data blocks. A different permutation of SLOT_NUMBER values may be effected by using a different right-hand expression in the SET clause or by using multiple UPDATE statements that modify the SLOT_NUMBER column in disjoint subsets of rows.

To implement limited dispersal, one can modify the above UPDATE statement appropriately and run the modified statement N times. In a preferred embodiment, a single SQL UPDATE statement running once can perform limited dispersal for a zero-based SLOT_NUMBER:

```
UPDATE <ingest_table>
SET slot_number =
FLOOR(slot_number*:B*:N/:R) + :B*MOD(slot_number,
:R/(:B*:N)) + FLOOR(slot_number*:N/:R)*(:R/:N−:B)
```

In the above UPDATE statement template, the bind variable B is set to the number of data blocks in each subset, the bind variable N is the number of subsets, and the bind variable R is set to the total number of rows.

R must be an integral multiple of B*N, and R rows must completely fill the data blocks. If the rows do not have an assignment that is sequential or sufficiently sequential, the above two UPDATE statements may not deliver a round robin assignment of rows to data blocks. In such cases, the set of rows on each block can be determined by a program, and a row-at-a-time UPDATE can be used to modify the SLOT_NUMBER in each row to disperse the rows appropriately. For example, in an Oracle database, the ROWID for a row can be used to determine the data block containing the header for the row.

Handling Non-Integral Multiples of Rows

In the discussions above, when the number of actual rows is not an integral multiple, enough dummy rows can be added to form an integral multiple to make the SQL statements work correctly. The additional dummy rows can be subsequently ignored by the application or explicitly deleted.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing, on a persistent storage device, a first set of items in a table that has a slot number column;
   wherein the persistent storage device comprises a plurality of persistent storage blocks;
   wherein storing the first set of items in the table causes a first set of rows that correspond to the first set of items to be stored in a set of two or more persistent storage blocks of the plurality of persistent storage;
   storing, in the slot number column, slot numbers that produce a particular item- dispersal pattern;
   wherein the particular item-dispersal pattern is such that rows, in the first set of rows, that contain consecutive slot numbers are not stored in a same persistent storage block;
   after storing the slot numbers that produce the particular item-dispersal pattern, storing subsequent sets of items in the table by performing updates, to the first set of rows, in a sequence that follows the slot numbers in the slot number column of the first set of rows; and
   wherein the method is performed by one or more computing devices.

2. The method of claim 1 wherein the first set of items comprise dummy data.

3. The method of claim 1 wherein the first set of items comprise items to be consumed by one or more consumers.

4. The method of claim 3 wherein:
   storing the first set of items includes storing an initial set of slot numbers in the slot number column;
   the initial set of slot numbers reflect the sequence in which the first set of items are stored in the table; and
   the step of storing slot numbers that produce the particular item-dispersal pattern is performed after the first set of items have been consumed by the one or more consumers by adjusting the initial set of slot numbers based on the persistent storage blocks on which corresponding rows are stored.

5. The method of claim 1 wherein the particular item-dispersal pattern is round- robin.

6. The method of claim 1 wherein:
   the persistent storage blocks are grouped into a plurality of round-robin block sets;
   the plurality of round-robin block sets includes a first round-robin block set and a second round-robin block set; and
   the particular item-dispersal pattern is a limited dispersal pattern in which rows are dispersed using a round-robin pattern within the first round-robin block set until the first round-robin block set is full, and when the first round-robin block set is full, rows are dispersed using the round-robin pattern within the second round-robin block set.

7. The method of claim 1 further comprising:
   building an index on the slot number column;
   after storing the slot numbers that produce the particular item-dispersal pattern, treating the slot number column and the index as read-only; and
   causing consumers to access particular items from the table in the sequence in which the particular items were stored in the table based on range scans of the index.

8. The method of claim 1 wherein:
   the table is used as a circular buffer to store variable-sized items;
   the method further comprises, prior to storing the first set of items:
   determining item sizes of items in a sample of the variable-sized items; and
   selecting a dummy-row size based on the item sizes of items in the sample of the variable-sized items; and
   the first set of items are dummy rows that have the dummy-row size.

9. The method of claim 1 wherein:
   the table is a partitioned table;
   the first set of rows are in a first partition of the table;
   the method further comprises, responsive to determining that more space is needed for storing items in the table, performing the steps of:
   adding a new partition to the table;
   storing a second set of items in the new partition of the table;
   wherein storing the second set of items in the new partition causes a second set of rows that correspond to the second set of items to be stored in a second set of two or more persistent storage blocks of the plurality of persistent storage blocks;
   in the second set of rows, storing, in the slot number column, slot numbers that produce the particular item-dispersal pattern; and after storing the slot numbers that produce the particular item-dispersal pattern in the second set of rows, storing subsequent sets of items in the new partition by performing updates, to the second set of rows, in a sequence that follows the slot numbers in the slot number column of the second set of rows.

10. The method of claim 1 further comprising:
creating a dequeue log table for storing rows that indicate which items from the table have been dequeued by one or more subscribers; and
storing, in a particular column of the dequeue log table, slot numbers that produce a second particular item-dispersal pattern;
wherein the second particular item-dispersal pattern is such that rows, in the dequeue log table, that contain consecutive slot numbers are not stored in the same persistent storage block; and
after storing the slot numbers that produce the second particular item-dispersal pattern, storing rows that indicate which items from the table have been dequeued by the one or more subscribers by performing updates, to existing rows in the dequeue log table, in a sequence that follows the slot numbers in the slot number column of said existing rows.

11. The method of claim 1 wherein:
each row in the first set of rows has a first size;
the first set of rows are stored in a first partition of the table;
while the first partition of the table is being used as a circular buffer for storing items to be consumed in a first-in first-out (FIFO) manner:
determining that a second size should be used for storing items; and
creating a second partition in said table, and populating the second partition with rows having the second size; and
after populating the second partition, storing new items in the second partition by performing updates to rows in the second partition and ceasing to store new items in the first partition.

12. The method of claim 11 further comprising, prior to storing new items in the second partition, causing physical dispersal of rows in the second partition.

13. The method of claim 1 wherein storing the first set of items in the table and storing the slot numbers that produce the particular item-dispersal pattern are both performed by executing a database command to insert the first set of rows into the table.

14. The method of claim 13 wherein the particular item-dispersal pattern is specified by an annotation and code for implementing the particular item-dispersal pattern during row insertion is database-resident.

15. One or more non-transitory computer-readable media storing one or more sequences of instructions that, when executed by one or more processors, cause:
storing, on a persistent storage device, a first set of items in a table that has a slot number column;
wherein the persistent storage device comprises a plurality of persistent storage blocks;
wherein storing the first set of items in the table causes a first set of rows that correspond to the first set of items to be stored in a set of two or more persistent storage blocks of the plurality of persistent storage blocks;
storing, in the slot number column, slot numbers that produce a particular item- dispersal pattern;

wherein the particular item-dispersal pattern is such that rows, in the first set of rows, that contain consecutive slot numbers are not stored in a same persistent storage block; and
after storing the slot numbers that produce the particular item-dispersal pattern, storing subsequent sets of items in the table by performing updates, to the first set of rows, in a sequence that follows the slot numbers in the slot number column of the first set of rows.

16. The one or more non-transitory computer-readable media of claim 15 wherein the first set of items comprise dummy data.

17. The one or more non-transitory computer-readable media of claim 15 wherein the first set of items comprise items to be consumed by one or more consumers.

18. The one or more non-transitory computer-readable media of claim 17 wherein:
storing the first set of items includes storing an initial set of slot numbers in the slot number column;
the initial set of slot numbers reflect the sequence in which the first set of items are stored in the table; and
the step of storing slot numbers that produce the particular item-dispersal pattern is performed after the first set of items have been consumed by the one or more consumers by adjusting the initial set of slot numbers based on the persistent storage blocks on which corresponding rows are stored.

19. The one or more non-transitory computer-readable media of claim 15 wherein the particular item-dispersal pattern is round-robin.

20. The one or more non-transitory computer-readable media of claim 15 wherein:
the persistent storage blocks are grouped into a plurality of round-robin block sets;
the plurality of round-robin block sets includes a first round-robin block set and a second round-robin block set; and
the particular item-dispersal pattern is a limited dispersal pattern in which rows are dispersed using a round-robin pattern within the first round-robin block set until the first round-robin block set is full, and when the first round-robin block set is full, rows are dispersed using the round-robin pattern within the second round-robin block set.

21. The one or more non-transitory computer-readable media of claim 15, wherein the one or more sequences of instructions further comprise instructions that, when executed by one or more processors, cause:
building an index on the slot number column;
after storing the slot numbers that produce the particular item-dispersal pattern, treating the slot number column and the index as read-only; and
causing consumers to access particular items from the table in the sequence in which the particular items were stored in the table based on range scans of the index.

22. The one or more non-transitory computer-readable media of claim 15 wherein:
the table is used as a circular buffer to store variable-sized items;
the one or more sequences of instructions further comprise instructions that, when executed by one or more processors, cause, prior to storing the first set of items:
determining item sizes of items in a sample of the variable-sized items; and
selecting a dummy-row size based on the item sizes of items in the sample of the variable-sized items; and the first set of items are dummy rows that have the dummy-row size.

23. The one or more non-transitory computer-readable media of claim 15 wherein:
the table is a partitioned table;
the first set of rows are in a first partition of the table;
the one or more sequences of instructions further comprise instructions that, when executed by one or more processors, cause, responsive to determining that more space is needed for storing items in the table, performing the steps of:
adding a new partition to the table;
storing a second set of items in the new partition of the table;
wherein storing the second set of items in the new partition causes a second set of rows that correspond to the second set of items to be stored in a second set of two or more persistent storage blocks of the plurality of persistent storage blocks;
in the second set of rows, storing, in the slot number column, slot numbers that produce the particular item-dispersal pattern; and
after storing the slot numbers that produce the particular item-dispersal pattern in the second set of rows, storing subsequent sets of items in the new partition by performing updates, to the second set of rows, in a sequence that follows the slot numbers in the slot number column of the second set or rows.

24. The one or more non-transitory computer-readable media of claim 15, wherein the one or more sequences of instructions further comprise instructions that, when executed by one or more processors, cause:
creating a dequeue log table for storing rows that indicate which items from the table have been dequeued by one or more subscribers; and
storing, in a particular column of the dequeue log table, slot numbers that produce a second particular item-dispersal pattern;
wherein the second particular item-dispersal pattern is such that rows, in the dequeue log table, that contain consecutive slot numbers are not stored in the same persistent storage block; and after storing the slot numbers that produce the second particular item-dispersal pattern, storing rows that indicate which items from the table have been dequeued by the one or more subscribers by performing updates, to existing rows in the dequeue log table, in a sequence that follows the slot numbers in the slot number column of said existing rows.

25. The one or more non-transitory computer-readable media of claim 15 wherein:
each row in the first set of rows has a first size;
the first set of rows are stored in a first partition of the table; the one or more sequences of instructions further comprise instructions that, when executed by one or more processors, cause: while the first partition of the table is being used as a circular buffer for storing items to be consumed in a first-in first-out (FIFO) manner:
determining that a second size should be used for storing items; and
creating a second partition in said table, and populating the second partition with rows having the second size; and
after populating the second partition, storing new items in the second partition by performing updates to rows in the second partition and ceasing to store new items in the first partition.

26. The one or more non-transitory computer-readable media of claim 25, wherein the one or more sequences of instructions further comprise instructions that, when executed by one or more processors, cause, prior to storing new items in the second partition, causing physical dispersal of rows in the second partition.

27. The one or more non-transitory computer-readable media of claim 15 wherein storing the first set of items in the table and storing the slot numbers that produce the particular item-dispersal pattern are both performed by executing a database command to insert the first set of rows into the table.

28. The one or more non-transitory computer-readable media of claim 27 wherein the particular item-dispersal pattern is specified by an annotation and code for implementing the particular item-dispersal pattern during row insertion is database-resident.

* * * * *

UNITED STATES PATENT AND TRADEMARK OFFICE
CERTIFICATE OF CORRECTION

PATENT NO. : 11,989,530 B2
APPLICATION NO. : 15/841149
DATED : May 21, 2024
INVENTOR(S) : Stamos et al.

Page 1 of 1

It is certified that error appears in the above-identified patent and that said Letters Patent is hereby corrected as shown below:

In the Claims

In Column 19, Line 54, in Claim 1, delete "storage;" and insert -- storage blocks; --, therefor.

In Column 19, Line 56, in Claim 1, delete "item- dispersal" and insert -- item-dispersal --, therefor.

In Column 20, Line 18, in Claim 5, delete "round- robin." and insert -- round-robin. --, therefor.

In Column 21, Line 67, in Claim 15, delete "item- dispersal" and insert -- item-dispersal --, therefor.

In Column 23, Line 29, in Claim 23, delete "or rows." and insert -- of rows. --, therefor.

Signed and Sealed this
Twenty-fourth Day of September, 2024

Katherine Kelly Vidal
*Director of the United States Patent and Trademark Office*